United States Patent [19]

Turnbough et al.

[11] 4,392,568
[45] Jul. 12, 1983

[54] LIVE ROLLER CONVEYOR

[75] Inventors: Harold L. Turnbough, St. Louis; Charles W. Werntz, Ferguson, both of Mo.

[73] Assignee: Alvey Inc., St. Louis, Mo.

[21] Appl. No.: 102,270

[22] Filed: Dec. 10, 1979

Related U.S. Application Data

[63] Continuation of Ser. No. 917,788, Jun. 22, 1978, abandoned.

[51] Int. Cl.³ .............................................. B65G 13/06
[52] U.S. Cl. ..................................... 198/781; 198/790
[58] Field of Search ....................... 198/781, 789, 790; 193/35 A

[56] References Cited

U.S. PATENT DOCUMENTS

| | | | |
|---|---|---|---|
| 3,108,671 | 10/1963 | Fuka et al. | 193/35 A |
| 3,612,247 | 10/1971 | Pipp | 198/781 |
| 3,900,097 | 8/1975 | de Courcy | 198/781 |
| 4,109,783 | 8/1978 | Vogt | 198/781 |

FOREIGN PATENT DOCUMENTS 1506968  7/1969  Fed. Rep. of Germany ...... 198/781

*Primary Examiner*—Joseph E. Valenza
*Attorney, Agent, or Firm*—Gravely, Lieder & Woodruff

[57] ABSTRACT

A live roller conveyor in which the conveyor path defined by a plurality of rollers is provided with roller drive means normally continually driving all of the rollers for conveying articles, and in which one or more article sensing rollers normally slightly raised above the conveyor path are depressed by articles propelled over the same and when depressed beyond a predetermined time interval serve to operate a combined brake and roller elevating means for arresting the article propelling drive of a group of rollers located upstream from the location of the depressed sensing roller and elevating the arrested group of rollers off of the roller drive means to reduce the drag on the drive means.

5 Claims, 14 Drawing Figures

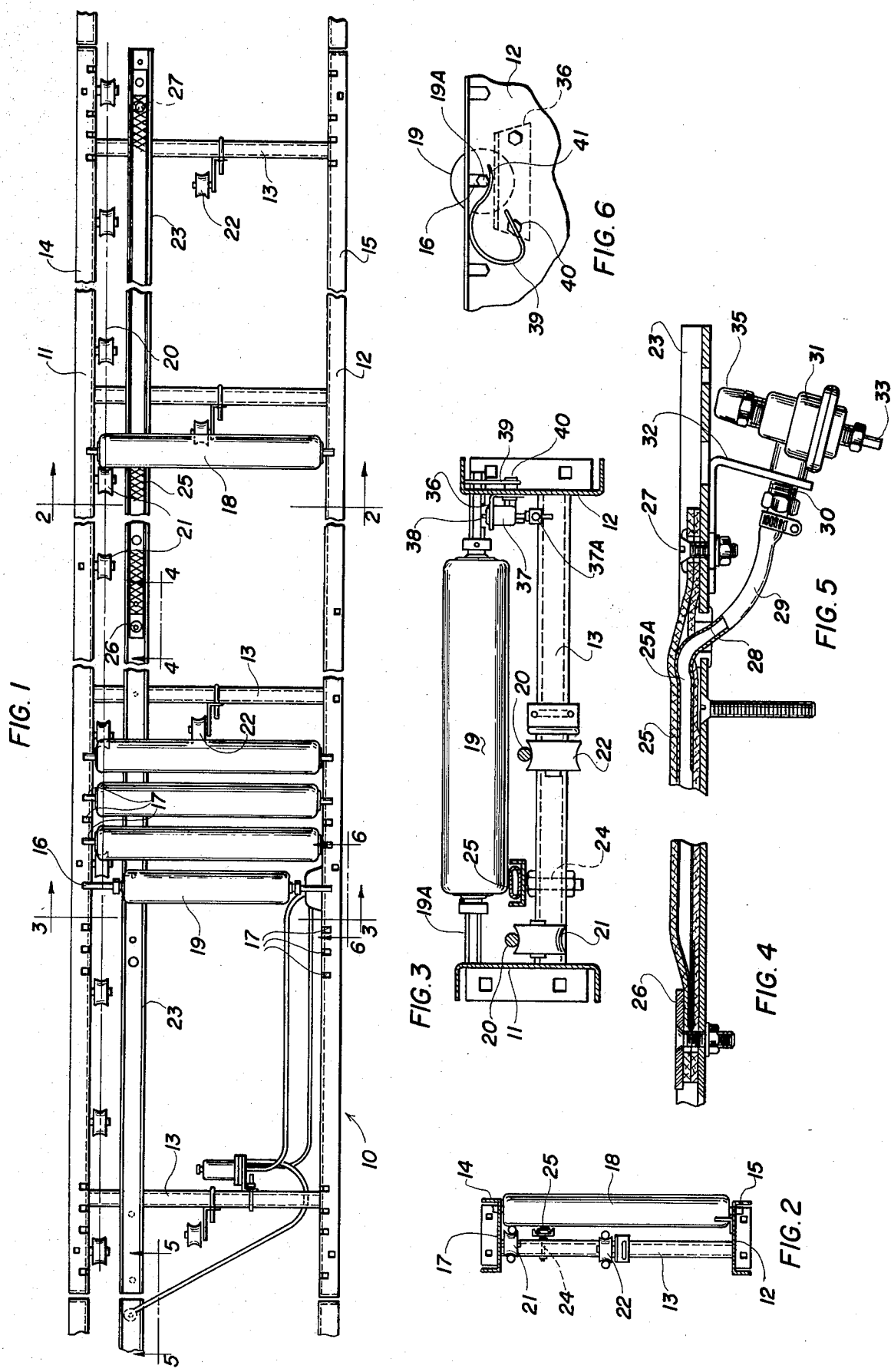

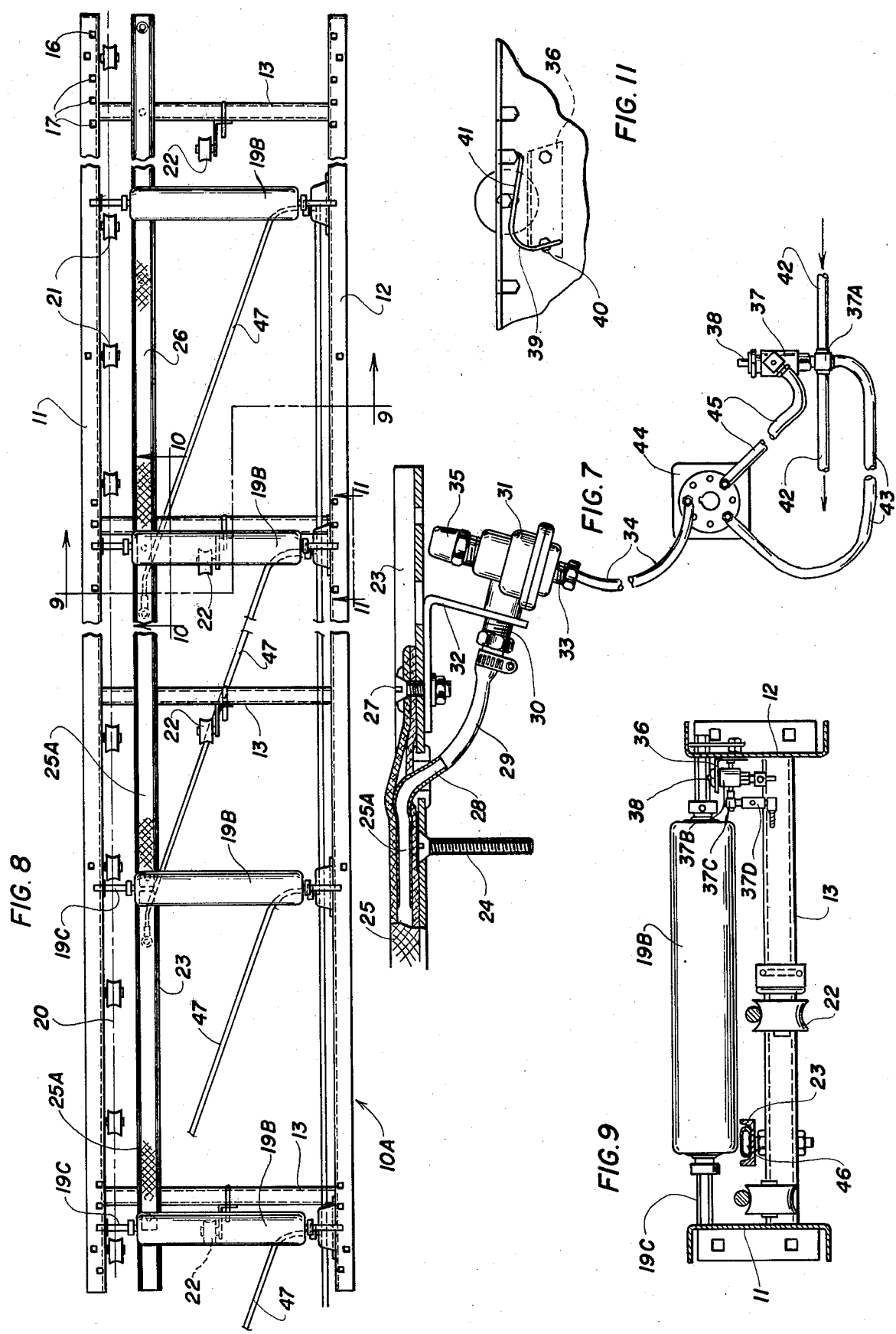

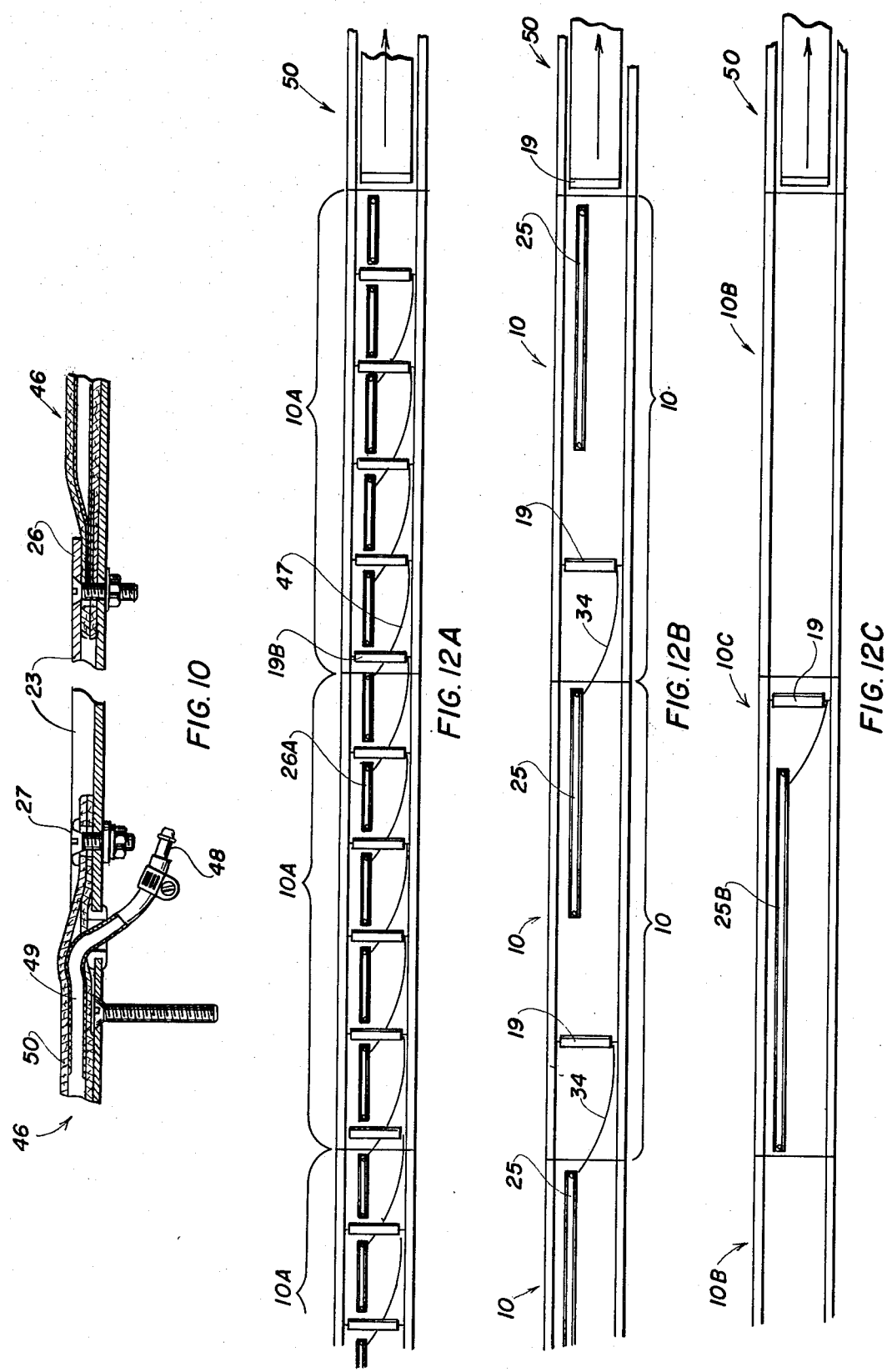

LIVE ROLLER CONVEYOR

This application is a continuation of application, Ser. No. 917,788 filed June 22, 1978, now abandoned.

BACKGROUND OF THE INVENTION

It is already known to control the movement of articles on a live roller conveyor by a driven belt or its equivalent which is moved into and dropped out of driving engagement with rollers that maintain a fixed position relative to the driven belt. Such an arrangement is disclosed by De Good in U.S. Pat. No. 3,724,642 of Apr. 3, 1973 where a pressure-type lifting means raises the driven belt into roller driving contact, and loss of pressure drops the driven belt out of roller driving contact. The action of the lifting means is controlled by sensor rollers in association with time delay valve means. A similar conveyor drive control arrangement is disclosed in Inwood et al in U.S. Pat. No. 3,768,630 of Oct. 30, 1973. It is also known to arrange article carrying rollers in a conveyor system where the rollers are normally resiliently lifted away from a driven belt having a fixed elevation so that the weight of articles depress the rollers and effect conveyance thereof. Such an arrangement is shown by Pipp in U.S. Pat. No. 3,612,247 of Oct. 12, 1971, and it includes an inflatable member to elevate the depressed rollers in the event an article is blocked and cannot move forward.

Live roller conveyors are known to have group roller braking provisions, such as the tension means of Fleischauer U.S. Pat. No. 3,621,982 of Nov. 23, 1971 which is actuated to apply a friction restraint on a group of rollers of sufficient magnitude to cause slippage in the roller drive means. An alternate braking arrangement is disclosed by Werntz U.S Pat. No. 4,006,815 of Feb. 8, 1977.

BRIEF DESCRIPTION OF THE INVENTION

This invention pertains to improvements in live roller conveyors provided with control means to regulate the movement of articles.

The objects of the present invention are several when applied to an article conveying assembly made up of rollers forming a conveying surface, and a continuously driven member held in contact with the rollers to rotate the rollers. One of the objects is to construct the conveyor in sections which may be connected end to end to form any desired length of conveyor, whether in a straight line or incorporating curved sections, and to be able to add the components of the present invention as and when desired. Another object is to provide a sectionalized conveyor assembly with sensor rollers in the respective sections to regulate the movement of articles in a manner which avoids the pressure of accumulating articles stopped by a lead article by removing the drive to the rollers upstream of the position of the blocked lead article whereby the articles are generally moved in spaced relation suitable for order-picking or processing applications where it is necessary to insert or remove certain articles.

A further object is to provide a sectionalized conveyor assembly with article sensor rollers in the down stream conveyor sections in control of the drive for the rollers in an upstream conveyor section so that some article accumulating pressure may be exerted on a lead article which is blocked, but of a low value so that such a conveyor installation may be utilized in moving a random mix of articles which vary in size and weight.

Yet a further object is to provide a sectionalized conveyor assembly which operates with controlled pressure between groups of articles by incorporating sensor rollers and brake means at substantial spaced intervals such that live roller sections alternate with controllable sections, whereby braking effect and driving effort are a function of article weight and friction with the rollers.

The foregoing objects will be illustrated in greater detail in the following description of the presently preferred arrangement of the invention.

BRIEF DESCRIPTION OF THE DRAWINGS

The present invention has been shown in certain preferred forms in the accompanying drawings, wherein:

FIG. 1 is a fragmentary plan view of one typical section of a conveyor run for packages or articles, the view showing certain details of the operating structure;

FIG. 2 is a transverse sectional elevation view taken along line 2—2 in FIG. 1;

FIG. 3 is a transverse sectional elevation view on an enlarged scale taken along line 3—3 in FIG. 1;

FIG. 4 is a fragmentary sectional view taken along line 4—4 in FIG. 1;

FIG. 5 is a further fragmentary sectional view of the means to supply air to and release air from the inflatable bladder of the inflatable brake member, the view being typical of the elements and members to be located along line 5—5 in FIG. 1;

FIG. 6 is a fragmentary elevational view taken along line 6—6 in FIG. 1;

FIG. 7 is a fragmentary view of a typical pressure air control system with valves and relays interconnecting the sensor roller with the inflatable member for stopping or releasing the carrier rollers;

FIG. 8 is a fragmentary plan view of a modified section of a conveyor run for packages or articles, the view showing certain modifications in the operating structure over the view of FIG. 1;

FIG. 9 is a transverse sectional elevation on an enlarged scale taken along line 9—9 in FIG. 8;

FIG. 10 is a fragmentary sectional view of the installation of the inflatable member taken along line 10—10 in FIG. 8 to show the location of sensor rollers between ends of the inflatable brake means;

FIG. 11 is a fragmentary elevational view taken along line -11- in FIG. 8; and

FIGS. 12A, 12B, and 12C are schematic plan views, without the details shown in views like FIG. 1 and FIG. 8, of conveyor runs utilizing the principle of the present invention in optional arrangements, wherein FIG. 12A is a view of several conveyor sections each with a plurality of sensor rollers set as in FIG. 8 to generate no pressure between packages, FIG. 12B is the arrangement seen in FIG. 1, and FIG. 12C is a modification of the arrangement seen in FIG. 1 employing an extended length inflatable member and associated sensor roller in alternate conveyor sections.

DETAILED DESCRIPTION OF THE EMBODIMENTS

The conveyor system referred to is seen in a preferred embodiment in FIGS. 1, 2, 3, and 4 which will now be described. The conveyor is composed of any desired number of sections, but for convenience one complete section 10 is shown in partially complete plan view and the adjacent ends of the side rails of two other sections are shown in alignment. It is understood that the longitudinal side rails 11 and 12 of all sections will be supported from the working area upon suitable legs or similar means (not necessary to show). Each rail is a channel set with its web vertically and held in spaced relation by spacer bars 13. The uppermost flanges 14 and 15 and portions of the vertical web of the respective rails 11 and 12 are formed with a series of single open slots 16 spaced from sets of three open slots 17, with the respective slots 16 and 17 in each rail 11 and 12 being oppositely aligned. The arrangement and spacing of the respective slots 16 and 17 allows the installation of the package carrier rollers 18 by dropping them into the selected rail flange slots at a desired spacing. Within each conveyor section 10 there is included a sensor roller 19 which has a special function to be described.

The carrier rollers 18 normally engage a suitable drive member 20 which is supported from below the rollers 18 on snubbing rollers 21 operably mounted on the inside of the web of channel 11. The drive member 20 may be powered in the manner shown and described in the application of Werntz, Ser. No. 801,535 filed May 31, 1977, now U.S. Pat. No. 4,117,923 of Oct. 3, 1978. The return or non-driving pass of the drive member 20 is supported on spaced idler rollers 22. The snubbing rollers 21 support the drive member 20 so it engages the adjacent ends of the carrier rollers 18, and the weight of the packages or articles on the carrier rollers 18 improves the driving engagement thereof on member 20. The length of the drive member 20 can be selected to accommodate any nuumber of conveyor sections 10 that are connected together.

A shallow upwardly opening channel 23 is located adjacent the line of snubbing rollers 21 and is supported from the spacer bars 13 (FIG. 3) by adjustable posts 24 so the vertical position of the channel 23 may be selected to be desirably close to the underside of the series of carrier rollers 18. The channel 18 carries an inflatable member 25 which has a closed end anchored (FIG. 4) in the channel by means 26. The opposite or open end of the member 25 is anchored by means 27. The member 25 as seen in FIG. 5 has its inflatable bladder 25A formed at the open end with a nipple 28 to which is connected an air tube 29. The tube 29 connects to a fitting 30 at a quick exhaust/inlet valve 31 supported on a bracket 32 fastened to the channel 23 by the means 27. The valve 31 has an air inlet fitting 33 forming a place where an air supply tube 34 may be connected (FIG. 7). A muffler element 35 is disposed opposite the fitting 33 to suppress noise as air is exhausted rapidly when deflating the member 25.

Referring to FIGS. 1, 3 and 6, it can be seen that the sensor roller 19 has a body shorter than the carrier rollers, but its shaft 19A is long enough to be dropped into the selected slots 16 in the side rails 11 and 12 so it will be free to lift, or be depressed as a package moves over it. The end of the sensor roller 19 adjacent the member 25 is located where the member 25 is anchored so it will not be raised upon inflating the member 25. The other end of shaft 19A resting in slot 16 in rail 12 passes over a bracket 36 fastened on the web of the rail. The bracket 36 supports a control valve 37 which has its activating element 38 normally held in contact with shaft 19A so as to follow the vertical displacement of the shaft 19A for sensor roller 19. The roller 19 (FIGS. 3 and 6) is normally raised at the end adjacent the rail 12 by a suitable spring 39 anchored at one end by the mounting element 40 for bracket 36. The other end of spring 39 is shaped at 41 to form a seat for the shaft 19A and by which spring the sensor roller 19 is angularly raised since it pivots from the opposite end of shaft 19A supported by rail 11.

Control valve 37 (FIG. 7) has a branched fitting 37A for making contact with the pressure air supply conduit 42 connected to all such valves 37 throughout the length of the conveyor composed of several sections 10. The fitting 37A also has a connection for a conduit 43 which leads to the proper fitting on a control relay device 44 which inclues an adjustable time delay mechanism in control of the passage of pressure air from conduit 43 to conduit 34. The device 37 may be a Clippard Valve, Model MAV-3 obtainable from Clippard Instrument Laboratory Cincinnatti, Ohio. The time delay mechanism is activated by pressure air supplied from control valve 37 through conduit 45 to the relay device 44. The relay device 44 may be a Clippard Delay Valve, No. R-331, three-way valve. The control valve activating element or plunger 38 is normally extended by internal resilient means, but is depressed when a package or article holds the sensor roller 19 down against the spring 39. The depresson of element 38 on valve 37 admits the pressure air to the relay device 44 which then is activated for the predetermined time span and at the end of the time span admits pressure air through conduit 34 and exhaust/inlet valve 31 to the bladder 25A which expands the member 25 under the group of carrier rollers 18 with which it may be associated. Expansion of the member 25 lifts all of the overlying carrier rolls off the drive member 20 and simultaneously brakes the rollers to a stop. Raising the rollers and braking them at about the same time stops advance of all packages or articles and also blocks the conveying path to following articles. Thus, a package or article which sits on sensor roller 19 and holds it depressed for the predetermined time will stop all rollers engaged by the member 25, and that will progressively stop packages or articles on other upstream sensor rollers not shown but constructed in like manner to the one described herein.

The drive member 20 may be a rope made by Sampson Cordage Works and sold under the trade name STABLE BRAID. This rope 20 is two ropes in one, constructed of a braided polyester outer cover and a concentric braided polyester inner core. On the other hand, the inflatable member 25 is a modified member 20 in which the inner core has been removed and a bladder 25A substituted. Thus, the outer braided cover of member 25 acts as a restraining means for the bladder 25A and causes it to inflate substantially uniformly along its length. When installed in the supporting channel 23, the member 25 is given a slight amount of longitudinal tension so the braided cover thereof will tend to compress the bladder 25A when the air is released and thus avoid imposing a drag on the carrier rollers 18.

Turning now to FIGS. 8 to 11, a modified conveyor assembly is shown wherein similar parts and members described by the same reference characters wherever possible. The side rails 11 and 12 of this conveyor assembly 10A are provided with groups of slots 17 on each side of a single slot 16, and this slot arrangement is the same in each rail, as noted for the rails in FIG. 1. Article or package carrying rollers 18 are dropped into selected ones of the rail slot to attain the desired spacing. These rollers 18 are normally in driving contact on the top of the drive rope 20 supported by snubbing rollers 21. A shallow channel 23 supported on rail spacer bars 13 carries a plurality of inflatable brake members 46 similar to member 25. The channel is adjustable so the brake member 45 when relaxed may be brought up close but not enough to develop a drag on the underside of the rollers 18.

The conveyor sections 10A differed from the conveyor sections 10 seen in FIG. 1 by being provided with a plurality of package or article sensing rollers 19B, each of which has its shaft 19C dropped into a selected slot 16 or 17, depending on the desired spacing pattern of carrier rollers 18. The sensor rollers 19B are generally equally spaced, with the most up-stream sensor roller connected to the most down-stream brake member 46 of the adjacent up-stream conveyor section 10A.

The operative connection between the sensor rollers 19B and the associated brake member 46 is the same for each so a description of one connection will suffice for each one. On reference to FIGS. 8 to 11 it can be seen that the end of shaft 19C is dropped into a slot in side rail 12, and is engaged by the seat portion 41 (FIG. 11) of a resilient element or spring 39. The other end of the spring 39 is secured by a mounting means 40 for the bracket 36 on the inside of the web of side rail 12. The bracket 36 carries the control valve 37B in position so its actuator element 38 engages the shaft 19C to follow the rise and fall thereof. Valve 37B in this case is provided at its side with a pressure air exhaust device 37C which may be a Humphrey Super Quick Exhaust Valve, Model SQE, and that device connects with a speed or time control valve device 37D which may be a Humphrey Speed Control Valve, Model SCI. These devices 37C and 37D connect in a series with the line 47 supplying pressure air to the inflatable brake member 46. The valve 37B has an inlet fitting 37A which is inserted in the pressure air supply buss 42, as seen in FIG. 7. The device 37C and 37D are made by Humphrey Products, Kalamazoo, Mich., or an equivalent thereof.

The line 47 leading from the respective devices 37D associated with each sensor roller 19B is connected to the nipple 48 (FIG. 10) of the inflatable bladder 49 which is contained in the braided outer layer 50 of the brake member 26. The nipple 48 is located at the live end of the brake member 46 which is fastened in the shallow channel 23 by means 27. The opposite end of each brake member 46 is fastened in the channel 23 by means 26. When a package or article depresses any one of the sensor rollers 19B that causes the valve 37B to open and supply pressure air to the device 37C which closes its exhaust outlet and delivers the pressure air through the timer device 37D of line 47 for inflating the associated brake member 46 to lift all of the carrier rollers 18 overlying it off the drive means 20 and at the same time stop the rotation of rollers 18. Packages or articles when stopped in this manner form a blockage for following packages or articles, thus progressively depressing up-stream sensor rollers 19B to stop the advance of those packages or articles. When the sensor roller 19B is released to rise, it causes air to be exhausted at device 37C to relax the brake.

The views in FIGS. 12A, 12B and 12C illustrate the versatile nature of the present invention. As an example, in FIG. 12A the conveyor sections 10A of FIG. 8 can be connected up to a stop belt unit 50 at the discharge end. The sensor rollers 19B are shown to be located at about two foot spacing for handling short articles or packages, and each sensor roller is connected by air line 47 to an up-stream brake member 46 (the carrier rollers 18 are not shown for clarity of disclosure). This arrangement results in the articles or packages not pressing against each other as the brake members stop the roller drive by lifting the groups of rollers 18 as noted before. The utility of this arrangement is recognized in installations calling for order picking at warehouses, or where articles need to be removed or inserted in the conveyor line with a minimum of effort. When the stop belt 50 is started the sensor rollers 19B are progressively released upstream, and the articles or packages on the conveyor begin moving in single spaced relation.

The view of FIG. 12B is the type of conveyor control described in FIGS. 1 to 7 which may operate to develop low pressure between packages or articles. The arrangement shown has each conveyor section 10 provided with a brake member 25 about one-half the length of the section 10, and one sensor roller 19. This arrangement is adapted for transporting and accumulating a random mix of articles or packages of different sizes and weights. A requirement is that the sensor roller 19 must be spaced from the up-stream brake means 25 a distance equal to the length of the longest article or package so as not to be capable of being relieved of the load.

The view of FIG. 12C shows an arrangement in which the stop belt 50 is connected to a continuously driven live roller conveyor 10B, and the latter conveyor is connected to a controllable conveyor section 10C which is provided with a sensor roller 19 associated with a long brake member 25B. The intent in this arrangement is to alternate conveyor sections 10B and 10C, although the drive means 20 will be continuous through all of the sections. In operation, the article or package pressure is essentially eliminated by each conveyor section 10C controlling the pressure generated by the continuously driven live roller conveyor sections 10B up-stream thereof. The braking effect and the driving effort are both a function of package or article size and friction so that this arrangement is best adapted for conveying a uniform size and weight of package or article. Adjustment of the positon of the drive means 20 and the elevation of the brake member 25B can result in obtaining essentially no forward advance of the load. When the stop belt 50 is operated, the load will move forward in slugs whose length can be selected by means of the time delay setting in device 44, and only short spaces will be formed. High speed operation will feed a continuous stream to a slower metering belt conveyor.

What is claimed is:

1. A roller conveyor comprising: a plurality of spaced apart and generally parallel article supporting rollers forming an article conveying path; drive means in said conveyor beneath said plurality of rollers and normally engaged therewith to drive said rollers collectively and thereby move articles along the conveying path; expansible chamber brake means in said conveyor spaced from a predetermined group of said rollers, said predetermined group of rollers occupying a length of the conveying path sufficient to support articles spanning a distance substantially equal in length to said expansible chamber brake means; a source of fluid pressure; article sensing means in said conveying path in position for sensing article movement along said conveying path down stream from the location of said expansible chamber brake means; and timing means operated by said article sensing means and connected to said source of fluid pressure and to said expansible chamber brake means, said timing means being operable following the passage of a predetermined time period in the determination by said sensing means of an interruption in the article movement therebeyond for applying fluid pressure to said expansible chamber brake means to raise said predetermined group of rollers away from said drive means and thereby interrupt the article conveying drive imparted to said predetermined group of rollers after said predetermined time period has passed for stopping article movement beyond said predetermined group of rollers, said fluid pressure applying means being inoperable to supply the fluid pressure to said expansible chamber brake means to raise said rollers away from engagement with said drive means upon article movement out of position in which the presence thereof is determined by said sensing means prior to the expiration of said predetermined time period.

2. The roller conveyor set forth in claim 1, wherein said timing means is adjustable.

3. A roller conveyor assembly comprising: a plurality of article supporting rollers forming a conveying surface; drive means normally operably engaged with said rollers from the underside of the conveying surface; a series of individual inflatable roller lifting and braking means spaced along beneath said article supporting rollers and being adjacent said drive means, each individual inflatable roller lifting and braking means being associated with a group of article supporting rollers; article sensing means spaced apart so as to be interspersed with said groups of article supporting rollers; means normally positioning said sensing means in a raised position so that said sensing means generates motion in being responsive to the passing of articles along said conveying surface; a source of pressure fluid connected to each of said series of inflatable roller lifting and braking means; a timing device inserted in each of said pressure fluid connections for measuring a predetermined time span, each said device being normally closed to the passage of pressure fluid; control means connected to each said device and having a position adjacent an article sensing means for actuation by the motion generated by said sensing means response to the passing of an article to admit pressure fluid to the connected one of said inflatable roller lifting and braking means and concurrently start the operation of said timing device to measure the time an article acutates a sensing means, whereby the actuation of a sensing means beyond the predetermined time admits pressure fluid to the connected inflatable roller lifting and braking means for lifting the associated group of article supporting rollers off said drive means.

4. The roller conveyor set forth in claim 3, wherein said control means operably responsive to motion of said sensing means includes a rapid acting pressure fluid release member for dumping the pressure fluid from said inflatable roller lifting and braking means, thereby lowering said group of article carrying rollers to resume being driven by said driving means.

5. The roller conveyor set forth in claim 3, wherein said individual inflatable roller lifting and braking means span groups of article supporting rollers having a predetermined length in the conveying surface substantially equal to the length of articles being conveyed.

* * * * *